US012717814B1

(12) United States Patent
Vikas et al.

(10) Patent No.: US 12,717,814 B1
(45) Date of Patent: Aug. 25, 2026

(54) DATABASE RECOVERY OF INDEPENDENTLY REPLICATED DATABASE SHARDS

(71) Applicant: Amazon Technologies, Inc., Seattle, WA (US)

(72) Inventors: Baljit Vikas, Bengaluru (IN); Amit Krishnan, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/254,826

(22) Filed: Jun. 30, 2025

(51) Int. Cl.
*G06F 16/27* (2019.01)
*G06F 11/1446* (2026.01)

(52) U.S. Cl.
CPC ........ *G06F 16/273* (2019.01); *G06F 11/1469* (2013.01); *G06F 2201/80* (2013.01)

(58) Field of Classification Search
None
See application file for complete search history.

(56) References Cited

U.S. PATENT DOCUMENTS

| | | | | |
|---|---|---|---|---|
| 7,685,109 | B1 * | 3/2010 | Ransil | G06F 16/2255 707/999.003 |
| 8,700,945 | B1 * | 4/2014 | Allen | G06F 11/076 714/4.11 |
| 10,740,355 | B2 * | 8/2020 | Horowitz | G06F 16/278 |
| 10,846,305 | B2 * | 11/2020 | Merriman | G06F 16/273 |
| 12,147,317 | B1 * | 11/2024 | Mohideen | G06F 11/1471 |
| 12,314,231 | B2 | 5/2025 | Hsieh et al. | |
| 2012/0023209 | A1 * | 1/2012 | Fletcher | H04L 12/40195 709/223 |
| 2020/0293407 | A1 * | 9/2020 | Depoutovitch | G06F 11/1469 |
| 2021/0157684 | A1 * | 5/2021 | Marathe | G06F 1/12 |
| 2023/0014427 | A1 * | 1/2023 | Cao | G06F 16/213 |

* cited by examiner

*Primary Examiner* — Christopher J Raab
(74) *Attorney, Agent, or Firm* — S. Scott Foster; Kowert, Hood, Munyon, Rankin & Goetzel, P.C.

(57) ABSTRACT

Database recovery of independently replicated shards may be performed. A recovery event to make a mirror location of shards of a database that is replicated independently and asynchronously from a primary location of the database is detected. To make the mirror location a new read-write location of the database according to the detected recovery event, a recovery point may be identified based on a gossip protocol that shares progress across the different shards in the mirror location that is used to access the database as the new read-write location.

20 Claims, 11 Drawing Sheets database service 210
request routing 344
router 371a
query engine 372a
recovery mgmt 373a
router 371b
query engine 372b
recovery mgmt 373b
router 371c
query engine 372c
recovery mgmt 373c
...
host(s) 310
database node 320a
query engine 321a
storage service engine 323a
host management 326a
database node 320b
query engine 321b
storage service engine 323b
host management 326b
...
virtualization manager 330
metadata service 348
control plane 347
compute management 342
shard management 346

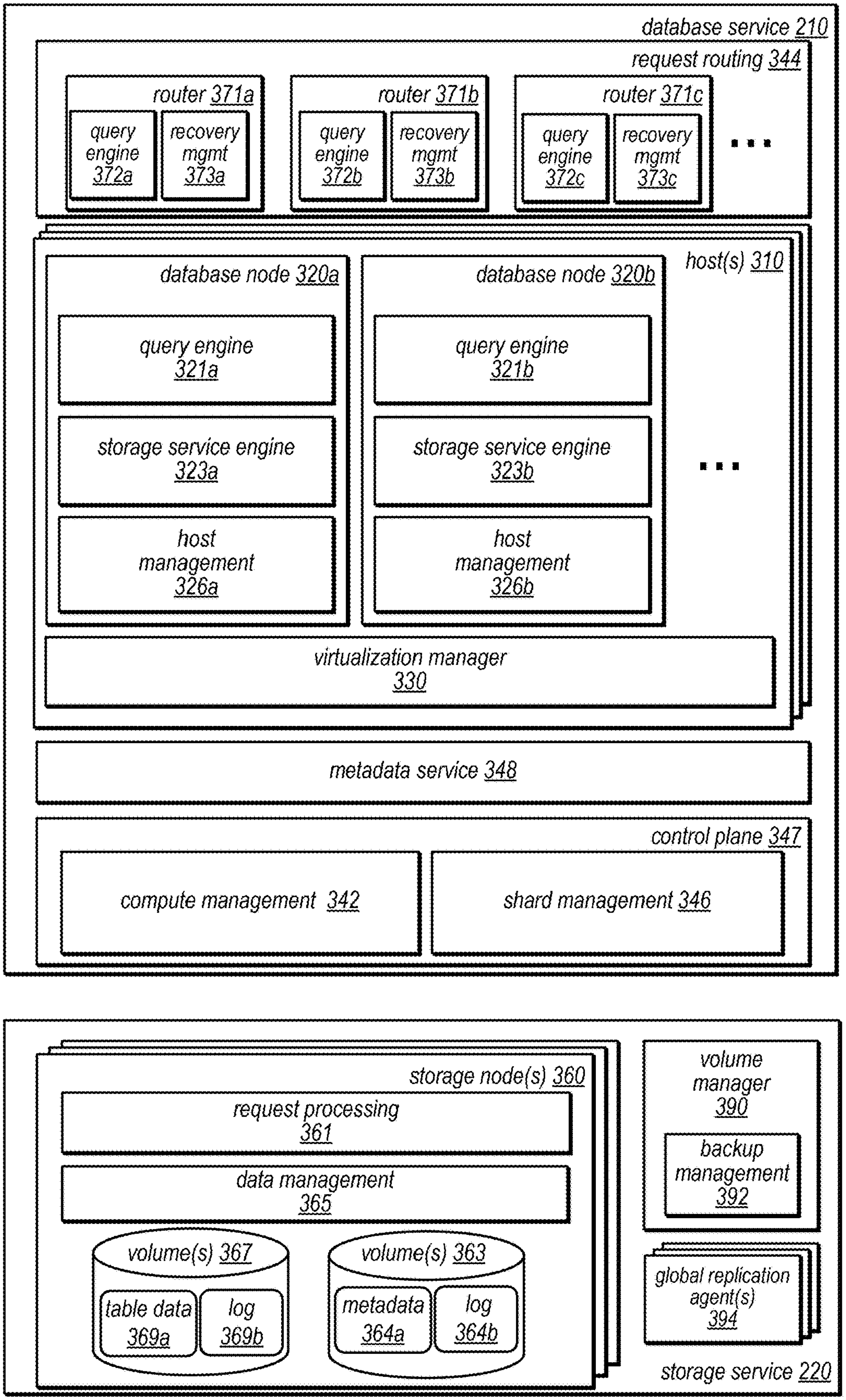

FIG. 3

Detect a recovery event at a mirror location of a database to make the mirror location of the database a new read-write location of the database, the database including multiple shards corresponding to different portions of database data that are independently replicated from copies of the shards in a primary location according to updates performed at different ones of the copies of the plurality of shards according to an asynchronous replication technique
1010

Make the mirror location of the database the new read-write location of the database according to the detected recovery event
1020

Identify a recovery point based on a gossip protocol between the shards in the mirror location, the gossip protocol sharing respective progress of the asynchronous replication from the copies of the shards in the primary location to the mirror location
1030

Provide access to the database using the recovery point at the mirror location as the new read-write location
1040

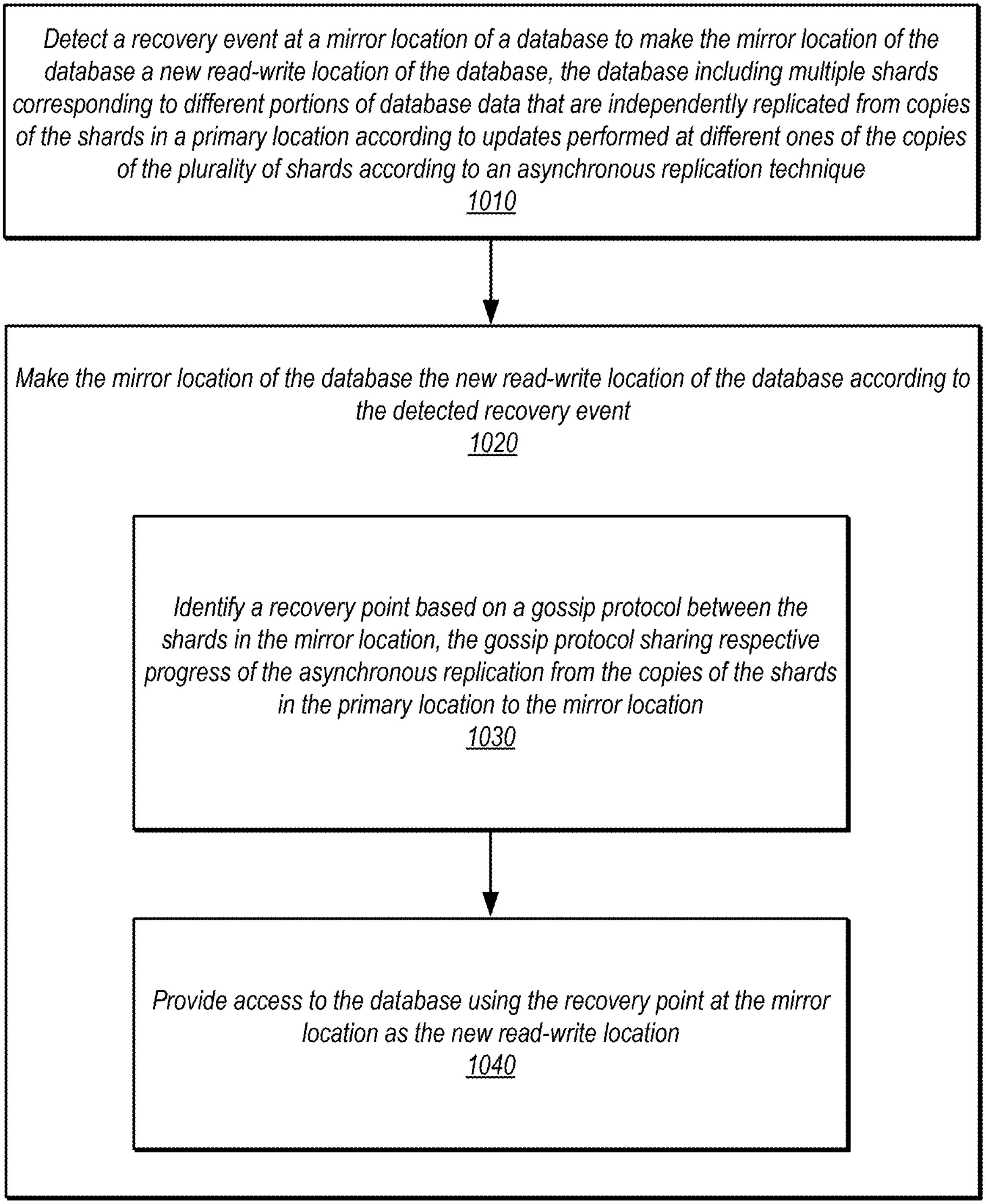

FIG. 10

DATABASE RECOVERY OF INDEPENDENTLY REPLICATED DATABASE SHARDS

BACKGROUND

Commoditization of computer hardware and software components has led to the rise of service providers that provide computational and storage capacity as a service. At least some of these services (e.g., managed services such as managed relational database services) may be distributed in order to scale the processing capacity of the service and increase service availability. Because distributed systems may be disrupted due network and other failure scenarios, resiliency to handle these various failure scenarios may be implemented to prevent disruption of client systems or applications that utilize these services.

BRIEF DESCRIPTION OF THE DRAWINGS

FIG. 3 is a block diagram illustrating various components of a database service and storage service that implements database recovery of independently replicated database shards, according to some embodiments.

FIG. 10 is a high-level flowchart illustrating various methods and techniques to implement database recovery of independently replicated database shards, according to some embodiments.

Figure 1:
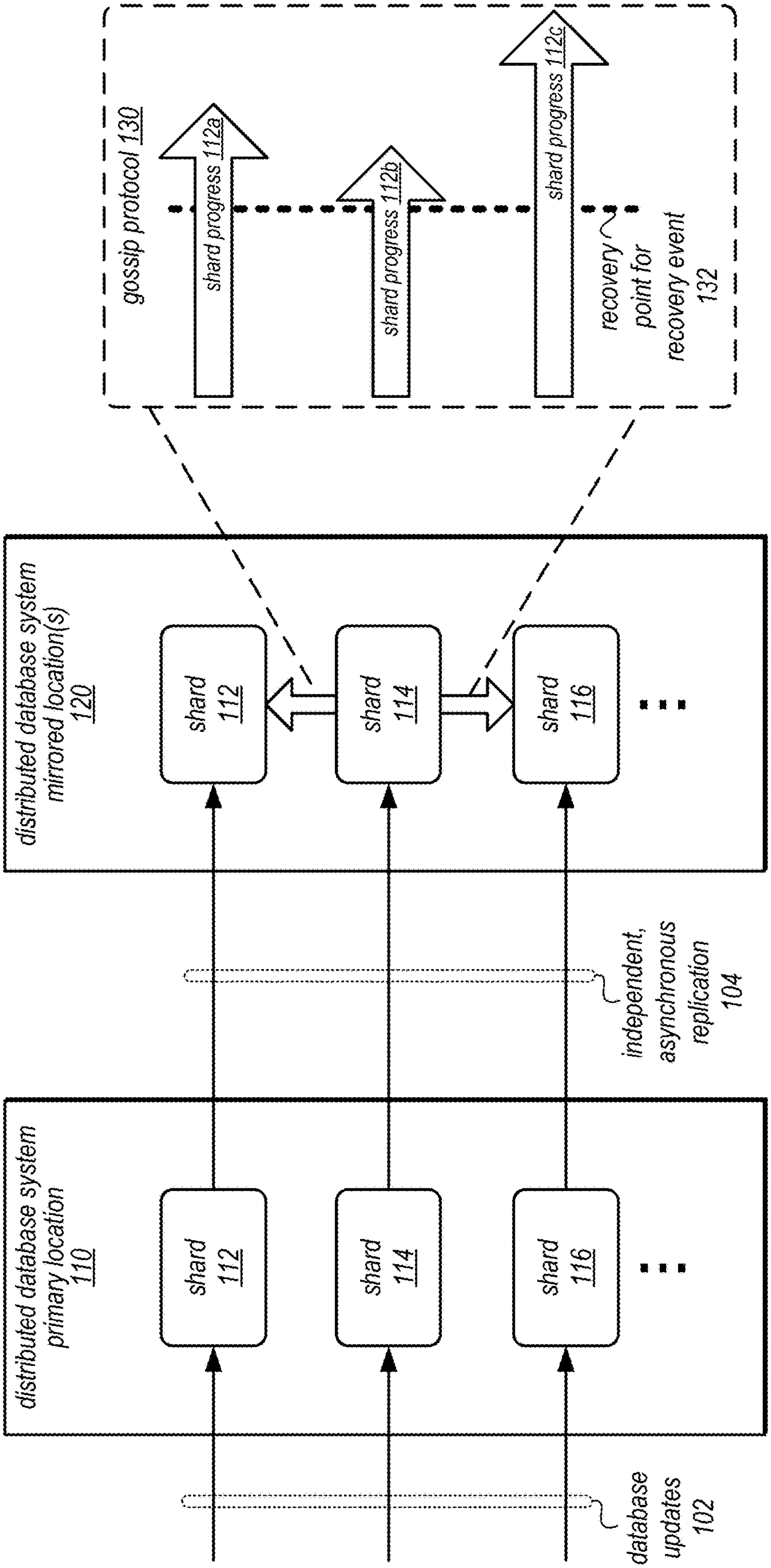
FIG. 1 is a logical block diagram illustrating database recovery of independently replicated database shards, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Techniques for database recovery of independently replicated database shards are described herein. Distributed database data enhances the capability of data systems to handle higher volumes or workloads of reads and/or writes to the database. To distribute the database data, in various embodiments, database data may be divided into different non-overlapping portions, referred to as shards, which may then be accessed separately and, in some scenarios, in parallel, to perform reads, writes, or any other database access requests. Copies of distributed databases, including copies of the shards of database data may also be maintained to improve the accessibility of database data. For example, copies may be mirrored using replication techniques from one location to another in order to make the mirror location available for handling additional read requests on the database data. In this way, mirror locations can act as further read capacity and provide data access locations when network distances become so larger (e.g., on different continents), that accessing closer data at a mirror location can significantly improve the performance of a client system that relies upon that data to perform various operations.

Sometimes, scenarios occur in which a mirror location for distributed database data may need to become a new read-write location for the distributed database data. For example, a failure of some kind in systems, infrastructure, or other interference may occur making it desirable to switch read and write access to a new location, such as the mirror location that has a copy of the database data. These, as well as other scenarios discussed below, may be recovery events, in which a database system may need to reason over the updates being made to each shard of the distributed database data in order to provide a correct and consistent version of the database when the mirror location becomes the new read-write location. Because replication techniques for mirror locations can occur asynchronously and independently from one another, techniques to make the mirror a new location might need to determine what is the correct and consistent version of database data to provide. Database recovery of independently replicated database shards as described in various embodiments may provide a technique to ensure that the correct and consistent version of database data is provided when making a mirror location a new read-write location. Furthermore, these techniques may ensure that client systems, applications, or services will not receive erroneous data in response to access requests. Accordingly, various embodiments of independently replicated database shards may increase the capabilities and improve the performance of distributed database systems and computer-related technology generally.

FIG. 1 is a logical block diagram illustrating database recovery of independently replicated database shards, according to some embodiments. Distributed database system primary location 110 may receive various database updates that are made to different shards, such as shards 112, 114 and 116. As given in the examples discussed below with regard to FIGS. 2-9, a primary location may be a cloud provider region or other location that has failure characteristics and access characteristics that may be independent of and different than distributed database system mirror location(s) 120.

Asynchronous replication techniques 104 may be used to communicate these updates, independently to each corresponding shard 112, 114, and 116 in distributed database system mirrored location(s) 120. In some embodiments, an asynchronous replication technique may not block progress or indications of completion for database updates 102 from being returned to clients. Instead, performance of updates 102 may complete at distributed database system primary location 110 without being synchronized to distributed database system mirrored location(s) 120. Additionally, each shard's replication may occur independently in addition to asynchronously, in some embodiments. For example, each shard may have its own replication process, component, or microservice that replicates updates from distributed database system primary location 110 to the corresponding copy of the shard in distributed database system mirrored location (s) 120 (e.g., shard 116 between primary location 110 and mirrored location(s) 120 independently from the replication of updates to shard 114). As a result, replication progress for each shard may proceed differently (e.g., shard 114 in mirrored location 120 may receive updates that occurred later in time before shard 116 receives updates that occurred earlier in time).

When a recovery event, such as an unplanned failover or promotion event, as discussed in detail below occurs, that would cause one of distributed database mirrored location(s) 120 to become a new read-write location (e.g., a new primary location or standalone read-write location), a recovery point across the shards may be determined, as indicated at 132. In order to determine the recovery point 132, information obtained using gossip protocol 130 may be used. For example, each respective shard's progress 112*a*, 112*b*, and 112*c*, may be communicated during replication so that when the recovery event occurs, each shard can quickly and accurately provide a minimum safe time or other point in time at which recovery for that shard can be performed that also is safe for other shards. In various embodiments, a safe time may be a point in time at which recovery can complete successfully because any necessary data, such as log records or other information that is maintained for that shard, is available to provide a consistent state of the shard at a same time that can also be provided by other shards. As discussed in detail below with regard to FIG. 8, a component may coordinate this technique, in some embodiments, such as a request router or other query engine which operates across shards, so that the recovery point can be used to establish a point (e.g., a version in time that is consistent and accurate at all the shards in the location) at which the new read-write location can access the distributed data of the database.

Please note, FIG. 1 is provided as a logical illustration of database systems and locations, and is not intended to be limiting as to the physical arrangement, size, or number of components or devices to implement such features.

The specification continues with a description of an example network-based database service that supports database recovery of independently replicated database shards may be implemented. Included in the description of the example network-based database service are various aspects of the example network-based database service, such as a database node, router, metadata service, control plane, and a storage service. The specification then describes flowcharts of various embodiments of methods for implementing database recovery of independently replicated database shards. Next, the specification describes an example system that may implement the disclosed techniques. Various examples are provided throughout the specification.

Figure 2:
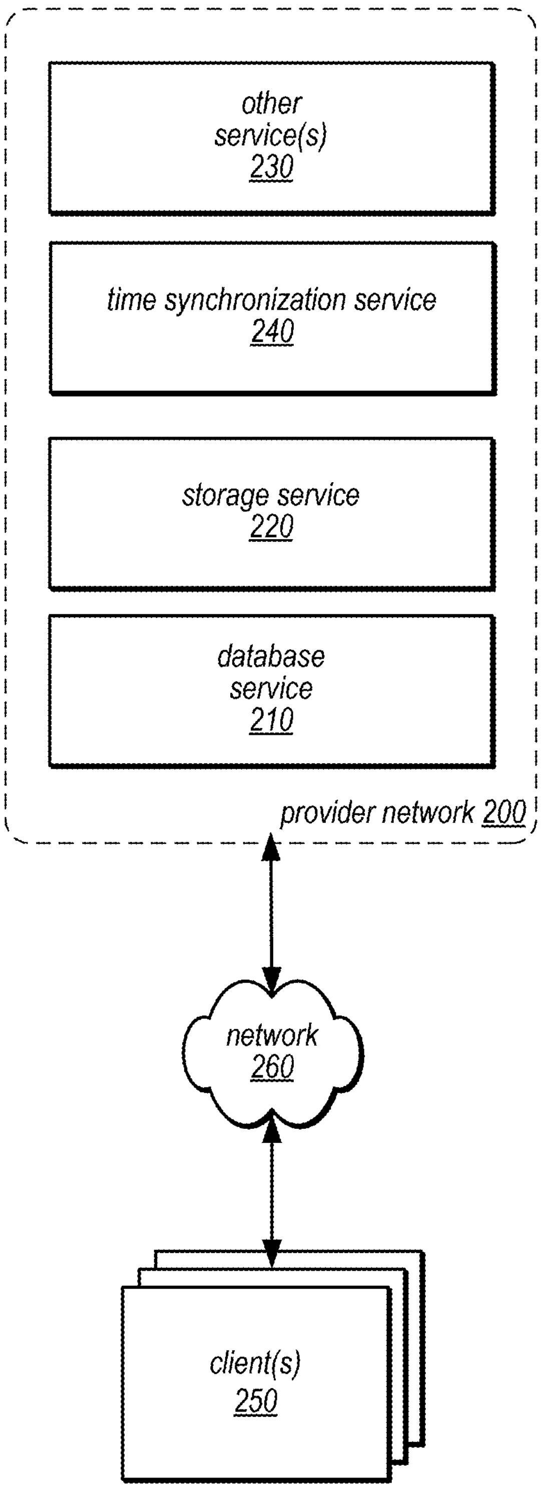
FIG. 2 is a block diagram illustrating a provider network that may implement a database service that implements database recovery of independently replicated database shards, according to some embodiments.

FIG. 2 is a block diagram illustrating a provider network that may implement a database service that implements database recovery of independently replicated database shards, according to some embodiments. A provider network, such as provider network 200, may be a private or closed system or may be set up by an entity such as a company or a public sector organization to provide one or more services (such as various types of cloud-based storage) accessible via the Internet and/or other networks to clients 250, in some embodiments. The provider network 200 may be implemented in a single location or may include numerous provider network regions that may include one or more data centers hosting various resource pools, such as collections of physical and/or virtualized computer servers, storage devices, networking equipment and the like (e.g., computing system 2000 described below with regard to FIG. 11), needed to implement and distribute the infrastructure and storage services offered by the provider network within the provider network regions.

For example, provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In the illustrated embodiment, a number of clients (shown as clients 250 may interact with a provider network 200 via a network 260. Provider network 200 may implement respective instantiations of the same (or different) services, a database services 210, time synchronization service 240, a storage service 220 and/or one or more other virtual computing service 230 across multiple provider network regions, in some embodiments. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within provider network 200 (e.g., a client application of database service 210 implemented on one of other virtual computing service(s) 230), in some embodiments. Therefore, various examples of the interactions discussed with regard to clients 250 may be implemented for internal clients as well, in some embodiments.

In some embodiments, a client 250 (e.g., a database service client) may provide access to network-based storage of database tables to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Generally speaking, provider network 200 may implement one or more service endpoints may receive and process network-based services requests, such as requests to access a database (e.g., queries, inserts, updates, etc.) and/or manage a database (e.g., create a database, configure a database, etc.). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements database service 210, time synchronization service 240, storage service 220 and/or another service(s) 230 for processing. In other embodiments, provider network 200 may be configured as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

In addition to functioning as an addressable endpoint for clients' network-based services requests, in some embodiments, provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another service 230 (or the underlying systems that implement those services).

In some embodiments, provider network 200 may also implement user authentication and access control procedures. For example, for a given network-based services request to access a particular database table, provider network 200 ascertain whether the client 250 associated with the request is authorized to access the particular database table. Provider network 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, provider network 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, services, like database service 210 or storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

FIG. 3 is a block diagram illustrating various components of a database service and storage service that implements database recovery of independently replicated database shards, according to some embodiments. Database service 210 may implement control plane 347 which may manage the creation, provisioning, deletion, or other features of managing a database hosted in database service 210. For example, database service 210 may implement different types of database tables that can be hosted in database service. One type of database table may be client-managed or single-volume table (e.g., a non-sharded table). Another type of database table may be a system-managed or distributed database table across a number of shards (e.g., a sharded table). In some embodiments, client-managed or single volume tables may be converted to system-managed or distributed database tables.

In some embodiments, control plane 347 may monitor the performance of host(s) 310 (e.g., a computing system or device like computing system 2000 discussed below with regard to FIG. 11) via compute management 342 and shard management 346 (e.g., via heat management 341) for high workloads (e.g., heat) and move or shard assignments away from some hosts to avoid overburdening host(s) 310. Control plane 347 may handle various management requests, such as request to create databases, manage databases (e.g., by configuring or modifying performance, such as by enabling a "limitless table feature" that creates or updates a sharded table, or other automated management feature in response to a request which may cause configuration of failover handling for unplanned failovers or to promote a mirror region of a database to a new read-write database. Control plane 347 may implement shard management 346 for system-managed tables to handle heat management 341, health monitoring 343 and placement management 345, as well as overall compute management 342 (e.g., also for client-managed tables).

Database service 210 may implement one or more different types of database systems with respective types of query engines for accessing database data as part of the database. In at least some embodiments, database service 210 may be a relational database service that hosts relational databases on behalf of clients. For example, database service 210 may implement various types of connection-based (e.g., having established a network connection between a database client and a router for an endpoint of a database which may route requests to various database nodes which may, for instance, facilitate the performance of various operations that continue over multiple communications between the database client and a connected router of a pool of routers 371*a*, 371*b*, 371*c*, and so on, of request routing 344 (or directly to a database node in some scenarios).

In some embodiments, pool of routers 371 may be assigned to a particular database, such that the combination of routers 371 and database nodes 320 may be considered a cluster. For example, when a client opens a client connection, the DNS (or NLB) will re-direct the physical socket connection to one of the routers 371. Since the routers 371 serve as the front end for all traffic, they may be implemented to be highly available. The routers may be similar to (e.g., run same engine binaries) to database nodes 310 and may, in some embodiments, host database tables (not illustrated). Each router 371 may be attached to one or more data stores to store metadata (and in some embodiments table data) and temporary tables or other temporary data that may need to be persisted locally. In some embodiments, a router 371 may be designated a router leader (e.g., one of a group of routers). The router leader will be the primary owner of system-managed table metadata. The router leader may also serve as the coordinator when necessary for operations that might require serialization. In some embodiments, routers 371 may be distributed across fault tolerance or other availability zones and may perform router failover (or router addition) in order to maintain high availability for a database to which the pool of routers are assigned.

In some embodiments, routers 371 may implement respective connection managers (not illustrated). As router nodes may mostly pull the data from database nodes for shards of a system-managed table (though not always as illustrated in some of the example distributed transaction techniques discussed below), in some embodiments, there may be a DB connection pool from every router 371 to every database node (e.g., for a database). However, reusing connections from one query engine (at a router) to another (e.g., to a query engine implemented on a database node) cannot usually be done between users. In such scenarios, the connection manager may be responsible for cleaning up a database connection (with a client application) after database session is closed (e.g., performing operations to clear data such as session configuration, user/role info, etc.) and starting processes, instances, or other components (e.g., pgBouncer instances for Postgres databases) for cases when new database nodes 320 and routers 371 nodes are added to a database with system-managed tables for a user as part of scale-out of database nodes or routers or recovery/replacement of existing database nodes or routers. When a new client application database connection to a router 371 needs to contact other nodes to obtain information to establish a new database connection (e.g., router or a database node), it does so through foreign data wrapper (FDW) managed foreign server, which may be modified to contact a local connection manager for getting an available database connection at which moment the session context may be set based on an original database connection to a router. This may include session configuration (e.g., selective) and user/role info. With that, request routing 344 may ensure that access to remote objects respects privileges and as database nodes are computation nodes as well configuration is set (as it may not be common for FDW established connections which set just a user based on user mapping configured for a foreign server).

In some embodiments, routers 371 may perform database transactions, including coordinating performance of database transactions. For example, routers may implement respective query engines 372*a*, 372*b*, and 372*c*, which may also implement MVCC in order to implement time-based MVCC to support increased consistency and isolation. In some embodiments, routers 371 may implement respective recovery management 373*a*, 373*b*, and 373*c*, in order to make a mirror cluster into a new read-write cluster (e.g., in place of or in addition to a primary cluster), as discussed in detail above with regard to FIG. 1 and below with regard to FIGS. 7-10.

Database service 210 may implement a fleet of host(s) 310 which may provide, in various embodiments, a multi-tenant configuration so that different database nodes, such as database node 320*a* and 320*b*, can be hosted on the same host 310, but provide access to different databases on behalf of different clients over different connections. While hosts(s) 310 may be multi-tenant, each database node 320 may be provisioned on host(s) 310 in order to implement in-place scaling (e.g., by overprovisioning resources initially and then scaling-based on workload to right-size the capacity that it is recorded as utilized for an account that owns or is associated with the database that is accessed by the database engine head node 320).

In various embodiments, host(s) 310 may implement a virtualization technology, such as virtual machine based virtualization, wherein database engine head node instances 320 may be different respective virtual machines, micro virtual machines (microVMs) which may offer a reduced or light-weight virtual machine implementation that retains use of individual kernels within a microVM, or containers which offer virtualization of an operating system using a shared kernel. Host(s) 310 may implement virtualization manager 330, which may support hosting one or multiple separate database engine head node instances 320 as different respective VMs, microVMs, or containers. Virtualization manager 330 may support increasing or decreasing resources made available to host(s) 310 to use for other tasks (including other database engine head node(s) 320) that were allocated to a database engine head node 320 upon creation at host(s) 310, as discussed below with regard to FIG. 9.

Database node(s) 320 may support various features for accessing a database, such as query engine(s) 321*a* and 321*b*, including MVCC using time and storage service engine(s) 323*a* and 323*b* discussed in detail below with regard to FIGS. 4-8. Database nodes 320 may implement agents, interfaces, or other controls according to the respective type of virtualization used to collect and facilitate communication of utilization metrics for in-place scaling, among other supported aspects of virtualization, such as host management 326*a* and 326*b*. For example, host management 326 may implement resource utilization measurement, which may capture and/or access utilization information for host(s) 310 to determine which portion of utilization can be attributed to a specific database engine head node 320.

In some embodiments, database data for a database of database service 210 may be stored in a separate storage service 220. In some embodiments, storage service 220 may be implemented as to store database data as virtual disk or other persistent storage drives. In other embodiments, embodiments, storage service 220 may store data for databases using log-structured storage. Storage service 220 may implement volume manager 390, which may implement various features including backup and restore 392. As discussed in detail below with regard to FIGS. 7 and 9, storage service 220 may implement global replication agents 394 in order to implement replication across provider network regions.

In some embodiments, data may be organized in various logical volumes, segments, and pages for storage on one or more storage nodes 360 of storage service 220. For example, in some embodiments, each database may be represented by a logical volume, such as logical volumes 367 and 363 (which may include both table data 369*a* and corresponding log(s) 369 (*b*) (e.g., redo logs). Table data 369*a* may be an entire table for a client-managed table or a shard of a system-managed table, as discussed in detail below. In some embodiments, volume(s) 363 may store metadata 364*a* for a database and a respective change log 364*b*. Each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, storage nodes 360 of storage service 220 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

In at least some embodiments, a command line, programmatic (e.g., API), or graphical user interface may be implemented for control plane 347. A request to enable or disable system-managed tables for a database may be received, in some embodiments. For example, the database may be identified (e.g., by identifier such as a number or resource number) along with the parameter set to enable or disable system-managed tables. In some embodiments, various system-management parameters, such as scaling limits for computing resources, including cost-based, resource-based, or other limitations, for instance as minimum and or maximum boundaries for scaling (or scaling within a period of time). In some embodiments, these system-managed table parameters can be separately configured to add, remove, or change the parameters. In some embodiments, enabling system-managed tables may include parameters to configure the availability of the table across one (or more) regions using global replication, as discussed below with regard to FIG. 7. In some embodiments, configuration of replication to add or remove mirror regions, configure flow control, mirror region lag, failover configuration, and/or to promote a mirror region as new, standalone read-write region that diverges from the current primary cluster region.

Enabling system-managed tables may cause the creation of (or transfer of) a network endpoint (e.g., a network address) that is specific to the database to route requests to request routing 344 (which may assign or distribute the request to connect the database to different ones of routers 371 according to a load balancing scheme). In this way, connection requests to access the database (whether for a system-managed table or client-managed table) may be routed through request router 344 (e.g., instead of being routed directly to an existing database node already assigned to a current client-managed table of the database). These system-managed table parameters may be stored or updated in an administrative database and/or database metadata that is used to control database service 210 management of the database using various control plane features.

In some embodiments, control plane 347 may receive request to create a system-managed table in a database or alter a client-managed table to a system managed table in the database. In some embodiments, these requests may be received at the database node for the database directly or at a router and thus may be received through the "data plane." These requests, however may then be forwarded or dispatched to control plane 347 to direct the operations to complete the requests.

Control plane 347 may perform the various operations to create or alter tables to system-managed tables. For example, aligned tables may be identified and stored across different shards, according to an initial placement hierarchy that may be determined for the system-managed table(s) (e.g., a default or standard hierarchy may be initially used and then modified overtime according various heat or operations). Various migration techniques may be used to move the existing table data to the appropriate shard or store, when received, new data into a table (e.g., as part of insert requests or batch updates to add table data). Control plane 347 may initialize or update metadata to identify the new (or altered) system-managed table so that routers may correctly identify and route requests to the appropriate database nodes. Control plane 347 may also provision or assign database nodes to shards of the system-managed table.

Figure 4:
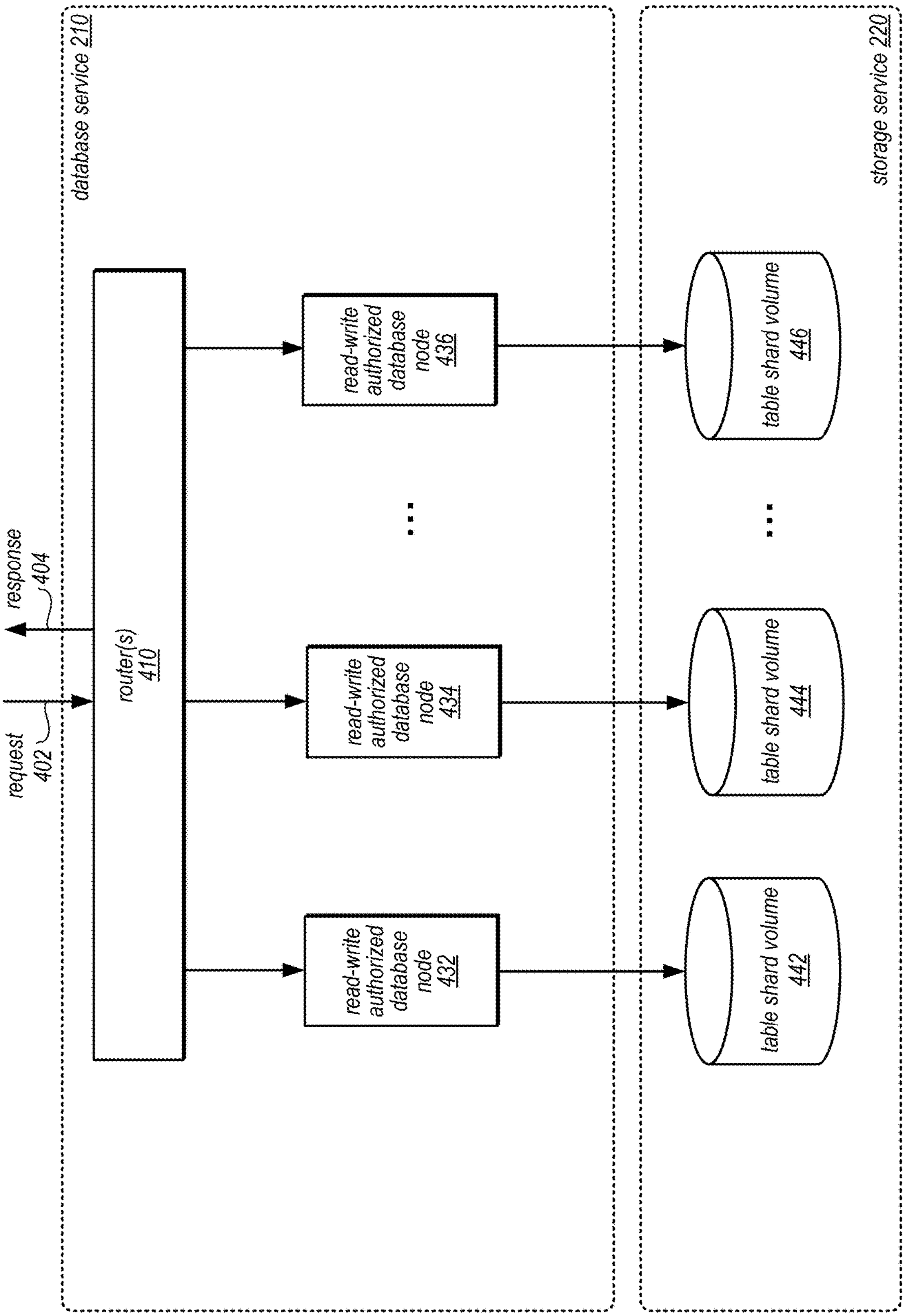
FIG. 4 is a block diagram illustrating a cluster of a distributed database shards, according to some embodiments.

FIG. 4 is a logical block diagram illustrating interactions for a database that includes both a client-managed table and a system-managed table. Request 402 may be received at one of many routers 410 that are implemented as part of database service 210, as discussed above with regard to FIG. 3. A router 410 may accept the request and direct it to the appropriate database nodes using both the query planning location selection techniques and, if a transaction, commit protocol techniques. A client-managed table may be stored in a client-managed table volume 426 which may be connected to assigned database nodes, such as read-write authorized database node 422. In some embodiments, read-only nodes **424*a* and 424*b*, can also be assigned to increase read capacity. Database node 422** can request data pages, send redo log records, and otherwise interact with client-managed table volumes for portions of access requests targeted to client-managed tables.

For a system-managed table, multiple shards may be determined assigned to different read-write database nodes 432, 434, and 436 respectively for shards stored in volumes 442, 444, and 446. Although not illustrated, read-only nodes may also be assigned to shards in order to satisfy the workload requirements on system-managed tables. The number of assigned database nodes and shards for a system-managed table may change over time as additional compute or storage capacity is needed. These changes may be determined automatically by database service 210 (e.g., via heat management 342).

Figure 5:
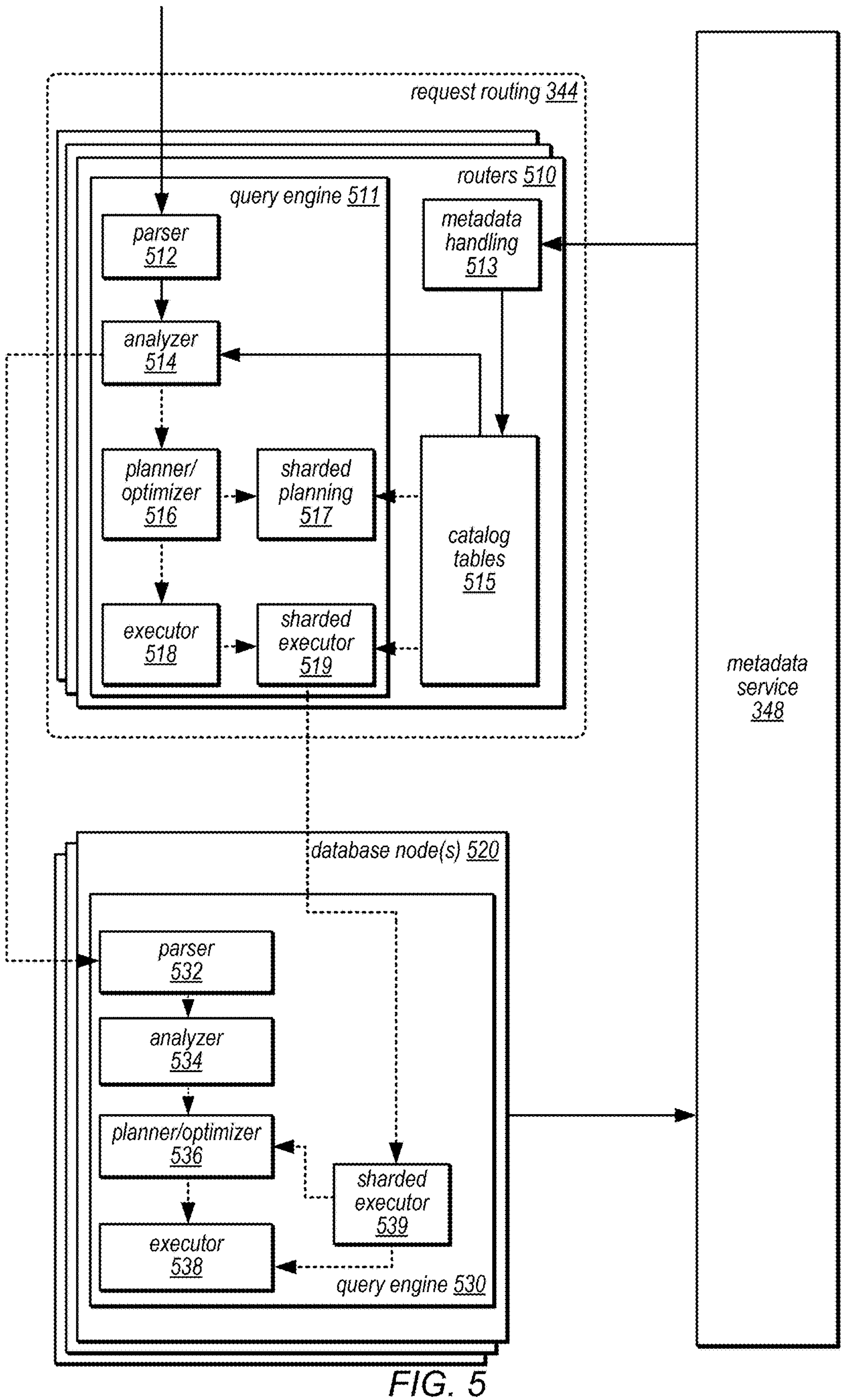
FIG. 5 is a logical block diagram illustrating a router that performs query routing across distributed database shards, according to some embodiments.

FIG. 5 is a logical block diagram illustrating a router that performs query routing across distributed database shards, according to some embodiments. Routers 510 may implement a query engine 511. When an access request is received, query engine 511 may parse the request at parser 512 and analyze the request at analyzer 514 to determine which shards or client-managed tables should be accessed to perform the access request according to catalog tables 515, which may be synchronized using metadata service 348 to obtain up-to-date shard, database node, and other assignments for tables in the database. Then, according to the analysis 514 different planning location(s) and execution paths (illustrated by the dotted line paths) may result. For example, network I/O minimization may be used to select between different distributed execution plans for access requests, in some embodiments.

For example, for router-selected planning, planner/optimizer 516 may generate a query plan and pass the plan off to sharded planning 517, which may add features to aggregate results from multiple database nodes at shards (and also a client-managed table if included in a request with one or more shards). The sharded plan may then be passed to executor 518 which may provide instructions to sharded executor 519 to perform at database node(s) 520. Database nodes 520 may perform different requests according to different execution paths (e.g., receiving subsets of plans for further planning/optimization 536 and then execution through sharded executor 539, or straight to executor 538 via sharded executor 539). Alternatively, when a database node is involved in performing a request (e.g., at only one database node), then the request may be sent for parsing 532, analysis 534, planning/optimization 536, and optimization 538. Although not depicted results may be returned from the database node(s) 520 to router 510 to return to a client (as depicted in FIG. 5).

Updates that are caused to metadata (e.g., changes to database schemas by DDL requests or modifications to client-managed tables that are replicated), may be reported through metadata service 348.

Multi-Version Concurrency Control (MVCC) may be implemented when querying or otherwise accessing a database. MVCC maintains different versions of data in a database and determines which version to provide to a transaction or other request (e.g., query) to ensure that the transaction operation achieves the desired isolation level and consistency. In this way, when database systems are handling concurrent transactions, each transaction may not interfere with another transaction (at least until a determination of whether a transaction can commit, which may handle conflicts between transactions and choose a winning transaction). MVCC can be implemented in different ways. Some implementations of MVCC utilize version identifiers, such as sequence numbers, to identify which version of data to provide. Time values are another technique for implementing MVCC.

Time-based MVCC may be implemented in various embodiments which considers and accounts for the nature of distributed systems, such as distributed database systems, which may experience clock value skew or other time discrepancies between different components of the database system. For instance, clock skew may occur where the difference in local clocks at different database system components (e.g., different servers in different physical locations, such as different data centers) can result in incorrect orderings and thus incorrect versions being provided. However, in various embodiments, techniques for implementing time-based MVCC to support repeatable-read isolation may be implemented, even when components can be highly susceptible to clock skew or other impacts on the correctness of local clocks.

For example, in various embodiments, a time synchronization system (e.g., time synchronization service 240 noted above in FIG. 2) may be implemented that can provide information about local clock times in a distributed system. The time synchronization system may provide a range of time for which a point in time can be considered to be accurate. This range may be described as clock boundaries, "Clockbound." The use of Clockbound may be to assign a time value (e.g., timestamp) to database system actions in order to support repeatable read and other database system features. Clockbound may be represented as a range [E<i>, L<i>] where E<i> stands for earliest time, L<i> stands for latest time. These ranges may then be used for comparing different events in time. In one example, [E1, L1] may be the timestamp range returned by a local clock that is synchronized according to a time synchronization system for a first event (e.g., transaction) T1 and [E2, L2] at event T2. If T2 happened after T1, then T2>T1 (T2 definitely happened after T1) and E2>=E1. Consider another example, where [E1, L1] is the timestamp range for event T1 on host H1 and [E3, L3] at event T3 on host H2, and T3 happened after T1. This implies T3>T1 (T3 definitely happened after T1), L3>E1.

MVCC may be implemented at both request routers and database nodes in order to support global read-after-write and repeatable read isolation using increasing time values. For example, when selecting which page versions to read (or from multiple versions obtained), a snapshot time may be utilized.

Figure 6:
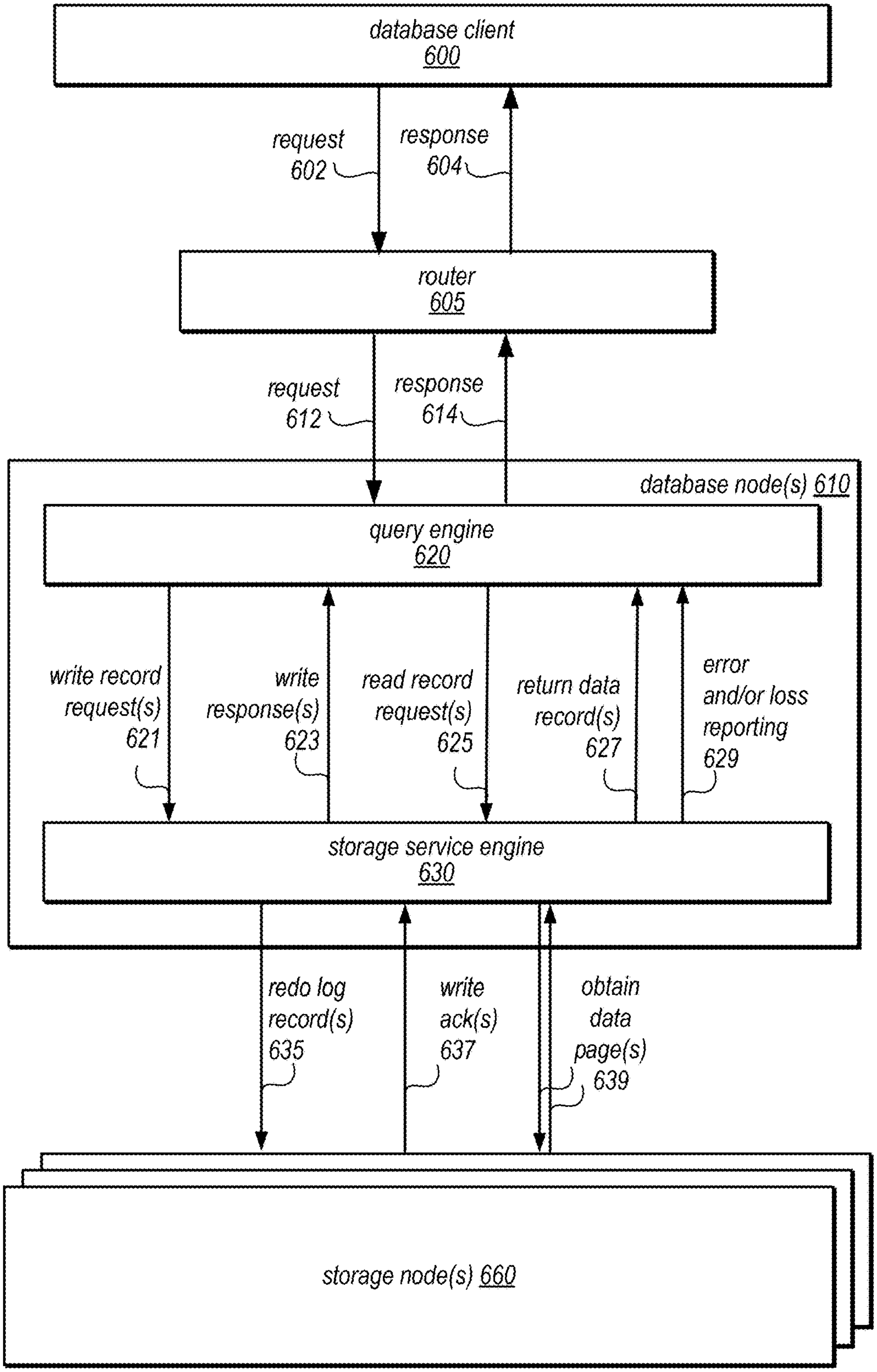
FIG. 6 is a block diagram illustrating various interactions to handle database client requests, according to some embodiments.

FIG. 6 is a block diagram illustrating various interactions to handle database client requests, according to some embodiments. In the example database system implemented as part of database service 210, a database engine head node 610 may be implemented for each database and storage nodes 660 (which may or may not be visible to the clients of the database system and may be similar to storage nodes 360 discussed above with regard to FIG. 3). Clients of a database may access a database node 610 directly in some embodiments (as indicated at request and response 603 instead of through router 610, such as requests that are directed to client-managed tables) via network utilizing various database access protocols (e.g., Java Database Connectivity (JDBC) or Open Database Connectivity (ODBC)). However, storage nodes 660, which may be employed by the database service 210 to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, storage nodes 660 may perform various storage, access, change logging, recovery, log record manipulation, and/or space management operations in a manner that is invisible to clients of a database node 610.

As previously noted, a database node 610 may implement query engine 620 and storage service engine 630, in some embodiments. Query engine 620 may receive requests, like request 612, which may include queries or other requests such as updates, deletions, etc., from a router 605 connected to a database client 600 which first received the request 602 from the database client 600. Implementing a router 605 between database client 600 and database node 610 may allow for database service 210 implement both client-managed tables and system-managed tables in the same database, as discussed in detail below. Query engine 620 then parses them, optimizes them, and develops a plan to carry out the associated database operation(s), as discussed in detail above.

Query engine 620 may return a response 614 to the request (e.g., results to a query) which router 605 may provide as response 604 to database client 600, which may include write acknowledgements, requested data (e.g., records or other results of a query), error messages, and or other responses, as appropriate. As illustrated in this example, database node 610 may also include a storage service engine 630 (or client-side driver), which may route read requests and/or redo log records to various storage nodes 660 within storage service 220, receive write acknowledgements from storage nodes 660, receive requested data pages from storage nodes 660, and/or return data pages, error messages, or other responses to query engine 620 (which may, in turn, return them to a database client).

In this example, query engine 620 or another database system management component implemented at database engine head node 610 (not illustrated) may manage a data page cache, in which data pages that were recently accessed may be temporarily held. Query engine 620 may be responsible for providing transactionality and consistency in the database of which database engine head node 610 is a component. For example, this component may be responsible for ensuring the Atomicity, Consistency, and Isolation properties of the database and the transactions that are directed that the database, such as determining a MVCC snapshot time of the database applicable for a query, applying undo log records to generate prior versions of tuples of a database. Query engine 620 may manage an undo log to track the status of various transactions and roll back any locally cached results of transactions that do not commit.

For example, a request 612 that includes a request to write to a page may be parsed and optimized to generate one or more write record requests 621, which may be sent to storage service engine 630 for subsequent routing to storage service nodes 660. In this example, storage service engine 630 may generate one or more redo log records 635 corresponding to each write record request 621, and may send them to specific ones of the storage nodes 660 of storage service 220. Storage nodes 660 may return a corresponding write acknowledgement 637 for each redo log record 635 (or batch of redo log records) to database node 610 (specifically to storage service engine 630). Storage service engine 630 may pass these write acknowledgements to query engine 620 (as write responses 623), which may then send corresponding responses (e.g., write acknowledgements) to one or more clients as a response 614.

In another example, a request that is a query may cause data pages to be read and returned to query engine 620 for evaluation. For example, a query could cause one or more read record requests 625, which may be sent to storage service engine 630 for subsequent routing to storage nodes 660. In this example, storage service engine 630 may send these requests to specific ones of the storage nodes 660, and storage nodes 660 may return the requested data pages 639 to database node 610 (specifically to storage service engine 630). Storage service engine 630 may send the returned data pages to query engine 620 as return data records 627, and query engine 620 may then evaluate the content of the data pages in order to determine or generate a result of a query sent as a response 614.

In some embodiments, various error and/or data loss messages 641 may be sent from log-structured storage service 650 to database node 610 (specifically to storage service engine 630). These messages may be passed from storage service engine 630 to query engine 620 as error and/or loss reporting messages 629, and then to one or more clients as a response 614.

In some embodiments, the APIs 635-639 to access storage nodes 660 and the APIs 621-629 of storage service engine 630 may expose the functionality of storage service 220 to database node 610 as if database node 610 were a client of storage service 220. For example, database node 610 (through storage service engine 630) may write redo log records or request data pages through these APIs to perform (or facilitate the performance of) various operations of the database system implemented by the combination of database node 610 and storage nodes 660 (e.g., storage, access, change logging, recovery, and/or space management operations).

Note that in various embodiments, the API calls and responses between database node 610 and storage nodes 660 (e.g., APIs 621-629) and/or the API calls and responses between storage service engine 530 and query engine 520 (e.g., APIs 635-639) in FIG. 6 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database node 610 and/or storage nodes 660.

Figure 7:
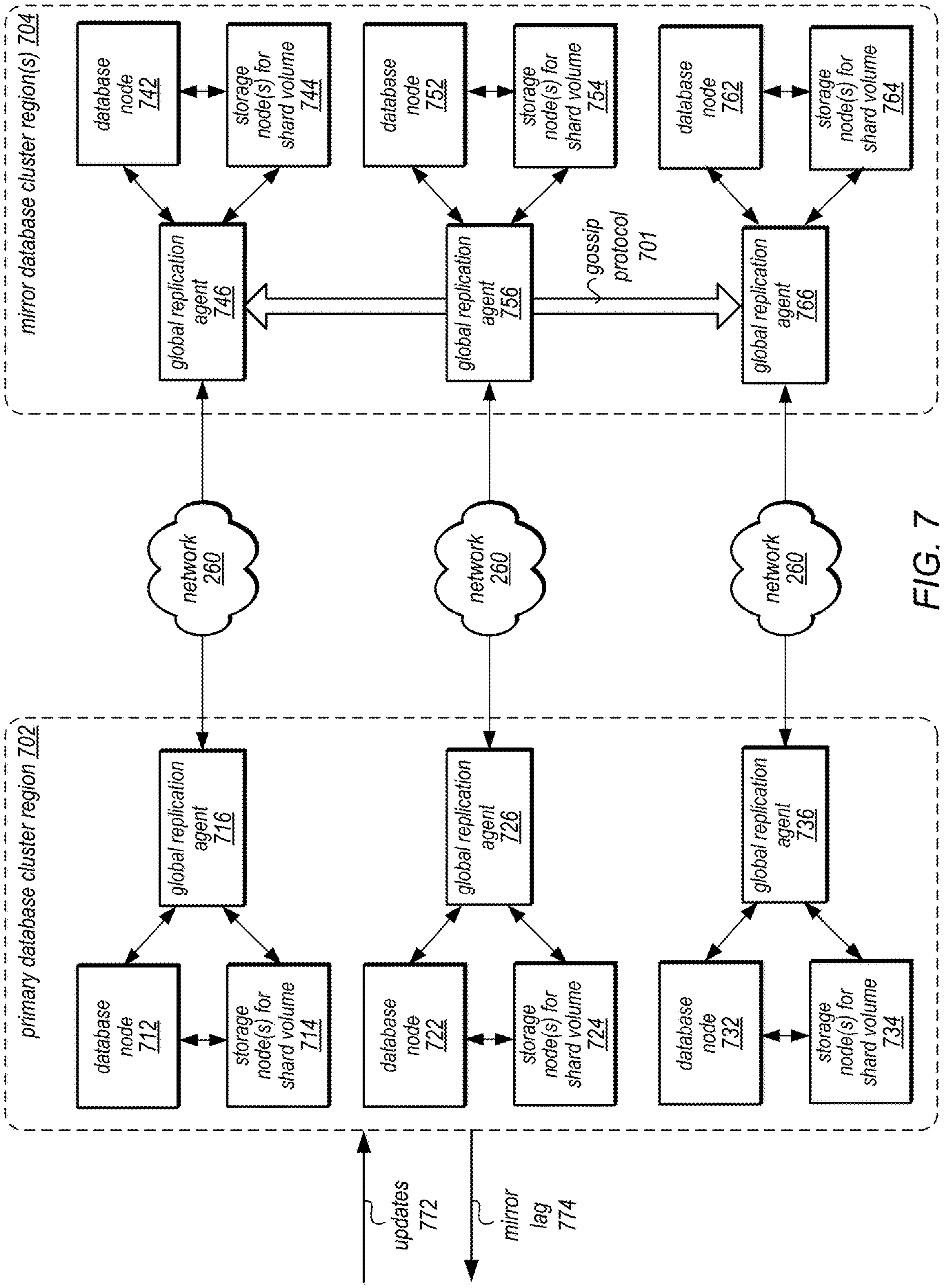
FIG. 7 is a logical block diagram illustrating independent, asynchronous replication across provider network regions of distributed database shards, according to some embodiments.

As discussed above, system-managed (or distributed) database tables may be replicated across regions of provider network 200. FIG. 7 is a logical block diagram illustrating independent, asynchronous replication across provider network regions of distributed database shards, according to some embodiments. As discussed above, database updates 772 (e.g., add data, remove data, change data in a table) may be performed using the techniques discussed above with regard to FIGS. 4-6. These updates may be made by database nodes, such as database nodes 712, 722, and 732, in primary database cluster region 702, which may be a read-write cluster of the database table, by writing redo log records to respective storage nodes of the volumes of each respective shards, such as storage node(s) 714, 724, and 734. In some embodiments, global replication agents, such as global replication agents 716, 726, and 736, may act as respective, internal clients of database nodes 712, 722, and 732, respectively, in order to query for (or otherwise obtain) and send the updates over a wide area network, such as network 260, to corresponding replication agent for each shard in mirror database cluster region(s) 704, such as replication gents 746, 756, and 766. Each shard's respective copies in different provider network regions may have an independent replication pipe or data flow such that each shard may progress in replication independent of other shards. As discussed above, this technique may be asynchronous such that update request may be acknowledged at primary cluster region 702 without having been confirmed as replicated to mirror cluster region(s) 704.

In some embodiments, mirror database cluster region(s) 704 may be read-only region(s) that provide read-only access to a database table using techniques similar to those discussed above with regard to FIGS. 4-6 using routers, not illustrated, and database nodes, such as database nodes 742, 752, and 762 that can access storage nodes for shard volumes 744, 754, and 764, respectively, without being allowed to perform updates. As noted above with regard to FIG. 1, global replication agents 746, 756, and 766, may implement a gossip protocol 701 to share replication progress information. In this way, recovery points can be quickly determined and, for systems that implement garbage collection and/or coalescing of log records, needed log records may be retained across the different shard volumes.

For example, truncation may be performed in recovery operations, as discussed below. In such scenarios, truncation beyond a global recovery time may be performed. To be able to truncate logs of volumes in storage, page coalescing on storage may need to be delayed. To delay page coalescing, an indicator within a log, represented by a Logical Sequence Number (LSN) for a shard volume may be the minimum recovery point LSN (MRPL). In at least one embodiment, global replication updates may be controlled by global replication agents and persisted periodically to metadata for a storage volume. Using gossip protocol 701, MRPL of a volume can advance according to every other volumes progress in the cluster. To do this, each global replication agent may send gossip communications (e.g., network messages to one (or more) other replication agents which may add their own respective information before passing it on to still further global replication agents). In this way, eventually each shard volume's information will be passed to every other shard volume's global replication agent. Gossiped information for a shard volume may include a time stamp corresponding to a volume's durable LSN (e.g., that has a number of copies stored within a protection group to survive failure). In this way, the lowest (e.g., oldest) time stamp corresponding to a volume durable LSN of all shard volumes can be shared and used to bound the MRPL across all shard volumes (e.g., as a cluster durable LSN (CDL)). By gossiping this information, other storage management processes directed either by a storage service engine or data management on storage nodes can be informed of the information shared using gossip protocol 701 in order to guarantee that the MRPL of each shard volume in a cluster, like mirror cluster region(s) 704, will delay page coalescing and avoid removing log records that may be used during recovery event handling, such as for promotions.

In at least some embodiments, primary database cluster of region 702 may report mirror lag 774 (e.g., via a dashboard, other provider network service, or other interface), indicating the lag between each mirror database cluster region 704 and primary database cluster region 702. For example, mirror lag may indicate an amount of data loss in events such as region failover. Mirror lag maybe aggregated lag across the whole mirror cluster. In some embodiments, lag can be determined at a shard level within a cluster, although in some embodiments it may not be exposed via an interface but maintained for internal monitoring/diagnosis purposes. To determine lag, primary cluster of region 702 may receive minimum complete LSN's (MCL) in the respective logs from each mirror shard will to primary shard's database node's storage service engine. This feedback can be provided piggy back on request/response model for replication, in some embodiments. Each primary shard may calculate its lag accordingly according to the primary shard's volume durable LSN minus the MCL time provided from a mirror shard. Then, primary region cluster (e.g., at the router) can aggregate the lags from each of these shards and routers and define a mirror cluster lag (e.g., max lag of all individual mirror shard lags).

Figure 8:
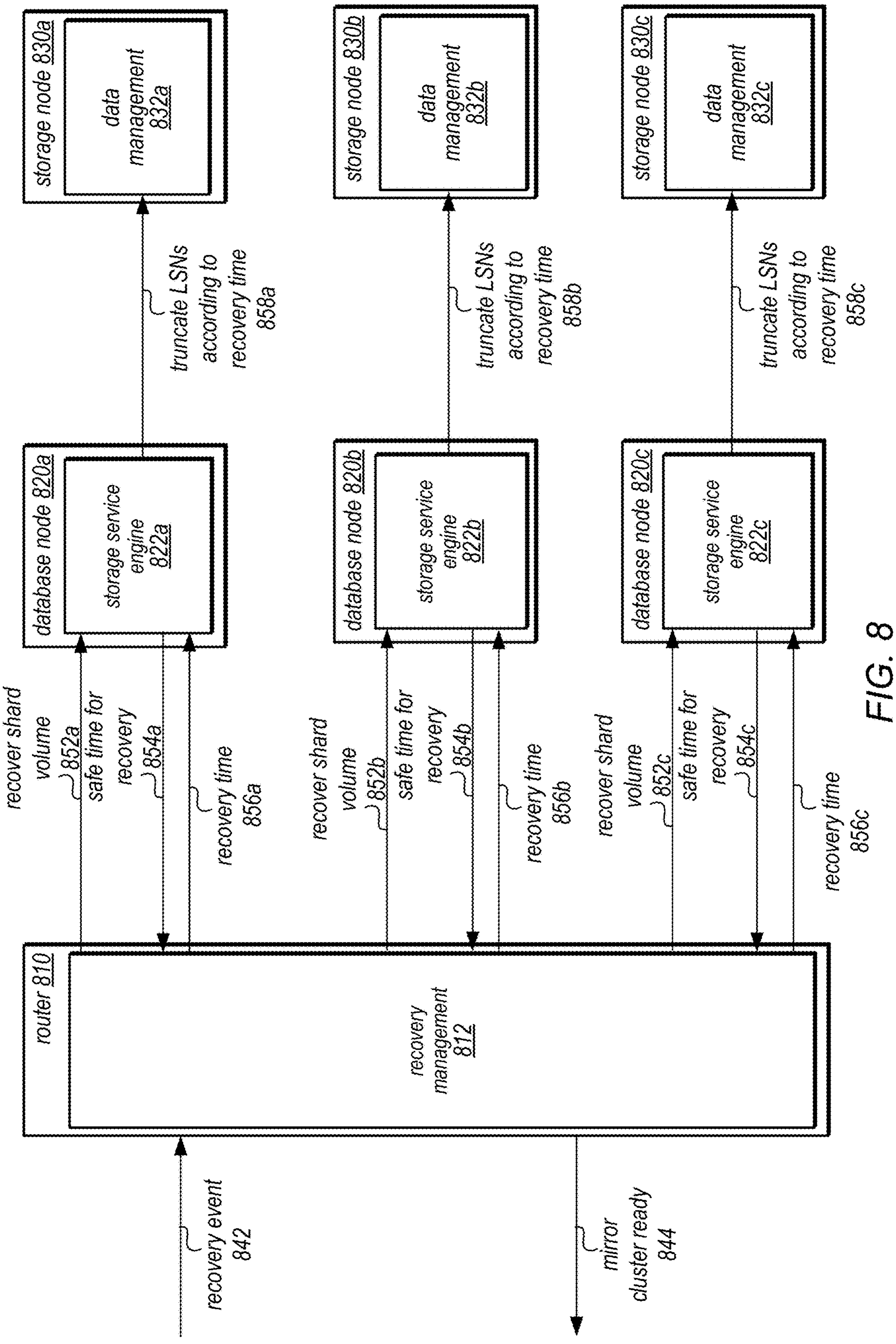
FIG. 8 is a logical block diagram illustrating handling recovery events to make a mirror cluster of distributed database shards a new read-write cluster of a distributed database shards, according to some embodiments.

Mirror clusters in other regions may provide additional and lower latency read access capacity for a database table for clients in different geographic locations that are far (e.g., in terms of network hops over a wide area network) from a primary cluster's region. Additional mirror clusters may also provide a cluster than can take over as a new primary cluster in the event of failure, an unplanned failover, or to provide an independent copy that will diverge from the primary cluster, by promoting to a separate (e.g., not globally replicated) read-write cluster. These scenarios may be detected or handled as recovery events that change a mirror cluster to a new read-write cluster. FIG. 8 is a logical block diagram illustrating handling recovery events to make a mirror cluster of distributed database shards a new read-write cluster of a distributed database shards, according to some embodiments.

As indicated at 842, a recovery event, such as an unplanned failover or promotion, may be detected at recovery management 812 of router 810 of a table cluster in a mirror region. In some embodiments, recovery events can be configured according to parameters submitted in a request (e.g., an API). For example, a promotion request may be submitted to make the mirror cluster a standalone read-write cluster of the distributed database table. In at least some embodiments, recovery events may include dynamic selection of one mirror cluster region to failover to as a new primary cluster according to the smallest amount of data loss indicated by the smallest lag. In some embodiments, recovery events may include a pre-configured selection of a mirror region (e.g., a specifically named or identified mirror region out of the set of mirror regions irrespective of mirror lag).

Recovery management 812 may tell each database node, **820*a*, 820*b*, and 820*c*, for each shard to perform shard volume recovery, as indicated 852*a*, 852*b*, and 852*c*. Each database node 820 may use respective storage engines, 822*a*, 822*b*, and 822*c*, to determine respective safe times (e.g., time values or time stamps corresponding to a volume durable LSN (VDL) of the shard volume stored at storage nodes 830*a*, 830*b*, and 830*c*, respectively). VDL may indicate the highest LSN of the highest update in a redo log that has been successfully and durably stored for a volume (e.g., a minimum number of copies to satisfy a PG or other requirement may have been met, such as 3 out of 5 volume copies have that redo log record stored). VDLs (as well as any other LSNs) can be mapped to time values using time synchronization service in order to understand that time is associated with the VDL. Such times may be provided as the safe times that are returned to recovery management 812, as indicated at 854*a*, 854*b*, and 854*c*. Recovery management 812 may then determine a global recovery time as the minimum (e.g., oldest or lowest) safe time across the shards, and provide that recovery time to each database node respectively, as indicated at 856*a*, 856*b*, and 856*c***.

As noted above, each storage service engine, **822*a*, 822*b*, and 822*c*, may be able to translate the global safe time into respective LSN values within their own volume's logs and then send respective truncation instructions to storage nodes 830*a*, 830*b* and 830*c*, which data management 832*a*, 832*b*, and 832*c*, may enforce or implement. In some embodiments, a truncation request may take the safe time and find the highest LSN of a complete update indicated in the log record, a Completion Point LSN (CPL), that maps to the global safe time (e.g., less than or equal to the global recovery time). In the event that multiple LSNs have the same timestamp, then a highest LSN value may be chosen. The chosen LSN may be the recovery LSN for that volume and a truncation command or instruction may be issued that truncates (e.g., makes invisible and not accessible to reads or other database access requests), starting from after the recovery LSN to the local VDL of that shard's volume. In order to ensure that new LSN values are not chose that fall into the truncation range, a second truncation range may also be enforced, in some embodiments that adds a range of burned LSN values that cannot be used (e.g., an 11 million number burn range) to the VDL. Once truncation has been successfully performed for each shard of the cluster (e.g., at each database node 820), recovery management can indicate that the mirror cluster is ready to be a new read-write cluster, as indicated at 844**.

Figure 9:
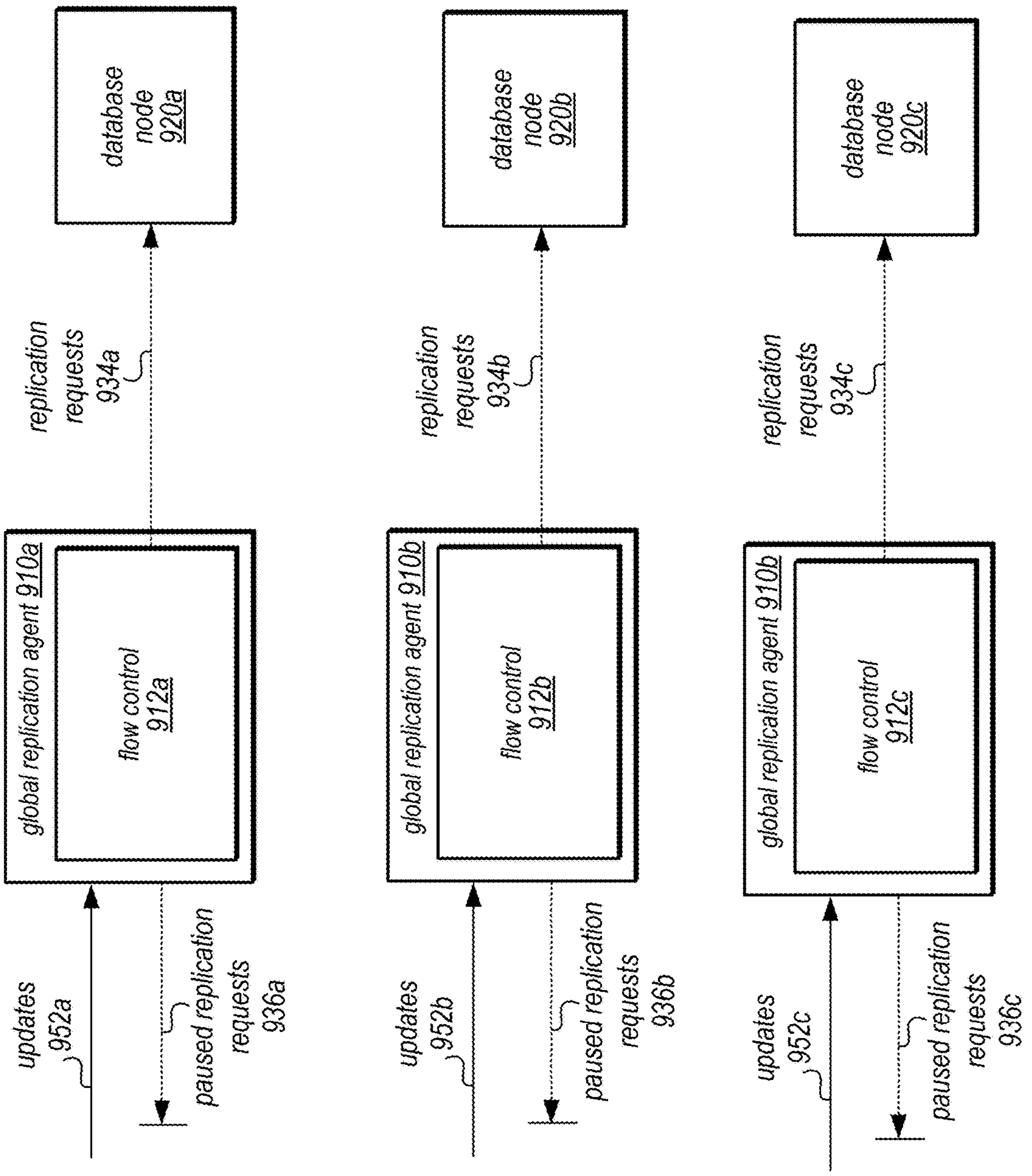
FIG. 9 is a logical block diagram illustrating flow control for independent, asynchronous replication across provider network regions of distributed database shards, according to some embodiments.

Because replication of updates is performed independently and asynchronously, large disparities in replication progress can cause performance problems at storage node. For example, as noted above, log record coalesce operations may be delayed until it can be ensured that these records may not be needed (e.g., until the MRPL has advanced. To prevent the MRPL from causing a great disparity in the ability to coalesce or perform other data management operations, flow controls may be implemented. FIG. 9 is a logical block diagram illustrating flow control for independent, asynchronous replication across provider network regions of distributed database shards, according to some embodiments.

As illustrated in FIG. 9, each global replication agent, agents 910*a*, 910*b*, and 910*c*, may receive respective updates, 952*a*, 952*b*, and 952*c*. Each global replication agent 910 may implement different respective flow controls, 912*a*, 912*b*, and 912*c*, may perform replication requests, 934*a*, 934*b*, and 934*c*, or pause them, as indicated at 936*a*, 936*b*, and 936*c*, according to information shared in a gossip protocol as discussed above. For example, the maximum difference between a slowest shard volume and other volumes may be monitored by each global replication agent, which may include getting information from storage nodes (not illustrated), such as memory utilization information. If flow control 912 detects that the replication is ahead for its volume greater than a threshold amount than the slowest volume (as indicated in gossip information), it will pause updates and not resume replication updates until the difference is within the threshold. New updates may not be retrieved (or may be buffered) until replication for that volume is resumed.

The database service and storage service discussed in FIGS. 2 through 9 provide examples of a database system that may implement database recovery of independently replicated database shards. However, various other types of distributed data processing systems may implement database recovery of independently replicated database shards.

FIG. 10 is a high-level flowchart illustrating various methods and techniques to implement database recovery of independently replicated database shards, according to some embodiments. Various different systems and devices may implement the various methods and techniques described below, either singly or working together. For example, a database service and storage service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 1010, a recovery event at a mirror location of a database to make the mirror location of the database a new read-write location of the database may be detected, in some embodiments. As discussed in detail above, recovery events may include requests to promote a mirror location to a standalone read-write location or a failover in order to keep database data available in the event of an unplanned failure. The database may distributed across multiple shards that include different portions of database data (e.g., different ranges of primary key or other identifier values such that no shard stores a record or data object also stored in a different shard). The shards may be independently replicated from copies of the shards in a primary location according to updates performed at different ones of the copies of the plurality of shards according to an asynchronous replication technique, in some embodiments.

As indicated at 1020, the mirror location may be made to be the new read-write location of the database according to the detected recovery event, in various embodiments. For example, as indicated at 1030, a recovery point may be identified based on a gossip protocol between the shards in the mirror location. As discussed above with regard to FIGS. 1 and 7, the gossip protocol may share replication progress information that allows for volume durability or other state information to progress, including an indication of a shard-specific recovery point. As discussed above, the recovery point may be a global recovery time in some embodiments, which may be used to translate between a time stamp or value determined using a time synchronization technique, system, or service, and individual logical orderings of updates (e.g. LSNs) for each shard.

As indicated at 1040, access to the database may be provided using the recovery point at the mirror location as the new read-write location, in some embodiments. For example, truncation techniques may be performed to exclude or otherwise make not visible log records or other data that was not recoverable across the shards when performing access requests (e.g., queries to read data or other updates to write data).

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 11:
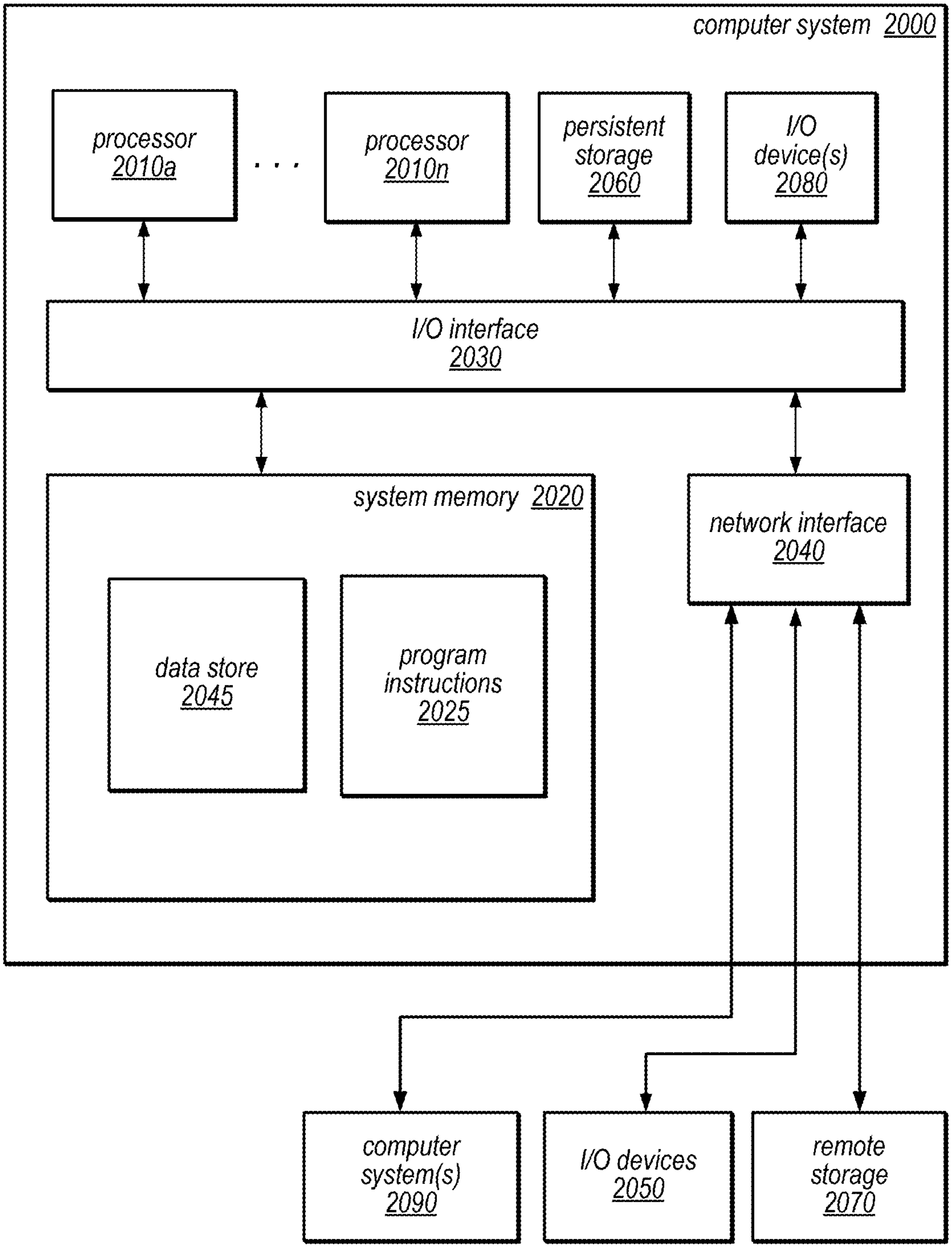
FIG. 11 is a block diagram illustrating an example computer system, according to various embodiments.

FIG. 11 is a block diagram illustrating an example computer system that may implement the various techniques discussed above with regard to FIGS. 1-10, according to various embodiments described herein. For example, computer system 2000 may implement a data processing node, router, and/or a storage node of a separate storage system that stores database tables and associated metadata on behalf of clients of the database tier, in various embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that may store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein (e.g., various features of fine-grained virtualization resource provisioning for in-place database scaling). In various embodiments, program instructions 2025 may be encoded in native binary, any interpreted language such as Java™ byte-code, or in any other language such as C/C++, Java™, etc., or in any combination thereof. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the database tier (e.g., on a primary node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, data pages, data records, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement one or more storage system server nodes, primary nodes, read-only node nodes, and/or clients of the database systems described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.).

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

a plurality of computing devices that implement a database service of a provider network, wherein the provider network is implemented in a plurality of different regions, and wherein the database service is configured to:

detect a recovery event, at a mirror region of a database that offers read-only access, to make the mirror region of the database a new read-write region of the database, wherein the database comprises a plurality of shards corresponding to different portions of database data that are independently replicated over a wide area network from copies of the plurality of shards in a primary region of the database that offers read-write access according to updates performed at different ones of the copies of the plurality of shards according to an asynchronous replication technique;

cause the mirror region of the database to be the new read-write region of the database according to the detected recovery event, wherein to cause the mirror region to be the new read-write region, the database service is configured to:

determine a recovery point based on a gossip protocol between the plurality of shards in the mirror region, wherein the gossip protocol shares respective progress of the asynchronous replication from the copies of the plurality shards in the primary region to the mirror region; and provide access to the database using the recovery point at the mirror location as the new read-write region.

2. The system of claim 1, wherein the event is an unplanned failover that causes the new read-write region to be a new primary region for the database that replicates to a different mirror region.

3. The system of claim 1, wherein the event is a promotion request that causes the new read-write region to be a standalone read-write region for the database.

4. The system of claim 1, wherein to provide access to the database using the recovery point, the database service is configured to apply truncation to respective logs of the shards that according to the recovery point.

5. A method, comprising:

detecting, by a distributed database system, a recovery event at a mirror location of a database to make the mirror location of the database a new read-write location of the database, wherein the database comprises a plurality of shards corresponding to different portions of database data that are independently replicated from copies of the plurality of shards in a primary location according to updates performed at different ones of the copies of the plurality of shards according to an asynchronous replication technique;

making, by the distributed database system, the mirror location of the database the new read-write location of the database according to the detected recovery event, comprising:

identifying a recovery point based on a gossip protocol between the plurality of shards in the mirror location, wherein the gossip protocol shares respective progress of the asynchronous replication from the copies of the plurality shards in the primary location to the mirror location; and providing access to the database using the recovery point at the mirror location as the new read-write location.

6. The method of claim 5, wherein the event is an unplanned failover that causes the new read-write location to be a new primary location for the database that replicates to a different mirror location.

7. The method of claim 5, wherein the event is a promotion request that causes the new read-write location to be a standalone read-write location for the database.

8. The method of claim 5, wherein providing access to the database using the recovery point comprises applying truncation to respective logs of the shards that according to the recovery point.

9. The method of claim 5, wherein the recovery point is a time value determined across the plurality of shards based on a time synchronization service.

10. The method of claim 5, wherein the asynchronous replication technique applies flow control to pause asynchronous replication of at least one of the plurality of shards upon a determination that a difference in replication progress is more than a threshold difference with respect to a slowest other one of the plurality of shards.

11. The method of claim 5, further comprising providing, via an interface of the distributed database system, a mirror lag that is determined for the mirror location based on individual lags of the plurality of shards compared to the copies of the plurality of shards in the primary location.

12. The method of claim 11, wherein the mirror lag is one of a plurality of different mirror lags for a plurality of different mirror locations, wherein the mirror lag is used to select the mirror location to make the new-read write location out of the plurality of different mirror locations.

13. The method of claim 5, wherein the distributed database system is a relational database service implemented by a provider network, wherein the database data is a table, and wherein the primary location and the mirror location are different regions implemented by the provider network.

14. One or more non-transitory, computer-readable storage media, storing program instructions that when executed on or across one or more computing devices cause the one or more computing devices to implement:

detecting a recovery event at a mirror location of a database to make the mirror location of the database a new read-write location of the database, wherein the database comprises a plurality of shards corresponding to different portions of database data that are independently replicated from copies of the plurality of shards in a primary location according to updates performed at different ones of the copies of the plurality of shards according to an asynchronous replication technique;

causing the mirror location of the database the new read-write location of the database according to the detected recovery event, comprising:

determining a recovery point based on a gossip protocol between the plurality of shards in the mirror location, wherein the gossip protocol shares respective progress of the asynchronous replication from the copies of the plurality shards in the primary location to the mirror location; and providing access to the database using the recovery point at the mirror location as the new read-write location.

15. The one or more non-transitory, computer-readable storage media of claim 14, wherein the event is an unplanned failover that causes the new read-write location to be a new primary location for the database that replicates to a different mirror location.

16. The one or more non-transitory, computer-readable storage media of claim 14, wherein the event is a promotion request that causes the new read-write location to be a standalone read-write location for the database.

17. The one or more non-transitory, computer-readable storage media of claim 14, wherein, in providing access to the database using the recovery point, the program instructions cause the one or more computing devices to implement applying truncation to respective logs of the shards that according to the recovery point.

18. The one or more non-transitory, computer-readable storage media of claim 14, wherein the recovery point is a time value determined across the plurality of shards based on a time synchronization service.

19. The one or more non-transitory, computer-readable storage media of claim 14, wherein the asynchronous replication technique applies flow control to pause asynchronous replication of at least one of the plurality of shards upon a determination that a difference in replication progress is more than a threshold difference with respect to a slowest other one of the plurality of shards.

20. The one or more non-transitory, computer-readable storage media of claim 14, storing further program instructions that when executed on or across the one or more computing devices further implement providing, via an interface of the distributed database system, a mirror lag that is determined for the mirror location based on individual lags of the plurality of shards compared to the copies of the plurality of shards in the primary location.

* * * * *